United States Patent [19]

Georgiadis et al.

[11] Patent Number: 5,933,414
[45] Date of Patent: Aug. 3, 1999

[54] METHOD TO CONTROL JITTER IN HIGH-SPEED PACKET-SWITCHED NETWORKS

[75] Inventors: Leonidas Georgiadis, Thessaloniki, Greece; Roch A. Guerin, Yorktown Heights, N.Y.; Vinod Gerard John Peris, Croton-on-Hudson, N.Y.; Rajendran Rajan, North Tarrytown, N.Y.; Subir Varma, Sunnyvale, Calif.

[73] Assignee: International Business Machines Corporation, Armonk, N.Y.

[21] Appl. No.: 08/738,647

[22] Filed: Oct. 29, 1996

[51] Int. Cl.⁶ .......................................................... H04L 5/22
[52] U.S. Cl. ........................... 370/238; 370/252; 375/371
[58] Field of Search .................................... 370/229, 230, 370/231, 235, 238, 253, 503, 509, 516, 517, 252; 375/371, 372

[56] References Cited

U.S. PATENT DOCUMENTS

| | | |
|---|---|---|
| 4,763,321 | 8/1988 | Calvignac et al. . |
| 4,878,219 | 10/1989 | Kaufman et al. . |
| 4,926,416 | 5/1990 | Weik . |
| 4,993,206 | 2/1991 | Yamashita . |
| 5,025,457 | 6/1991 | Ahmed . |
| 5,206,857 | 4/1993 | Farleigh . |
| 5,229,998 | 7/1993 | Weisser . |
| 5,271,000 | 12/1993 | Engberson et al. . |
| 5,570,346 | 10/1996 | Shur .......................................... 370/231 |
| 5,754,529 | 5/1998 | Heiss ........................................ 370/232 |

FOREIGN PATENT DOCUMENTS

| | | |
|---|---|---|
| 2130234 | 2/1995 | Canada . |
| 01-235-437 | 9/1989 | Japan . |

OTHER PUBLICATIONS

H. Zhang and D. Ferrari, "Rate–Controlled Service Disciplines", Jour. High–Speed Networks, vol. 3, No. 4, 1994, pp. 389–412.

A. K. Parekh and R. G. Gallagher, "A Generalized Processor Sharing Approach to Flow Control in Integrated Services Network: The Multiple Node Case," IEEE/ACM Transactions on networking, vol. 2, No. 2, pp. 137–150, Apr. 1994.

L. Georgiadis, R. Guerin, V. Peris, and K. Sivarajan, "Efficient Network QoS Provisioning Based on per Node Traffic Shaping,", May 1995.

C. Patridge, "A Proposed Flow Specification", IETF, Network Working Group Request for Comment 1363, Sep. 1992.

*Primary Examiner*—Chi H. Pham
*Assistant Examiner*—Frank Duong
*Attorney, Agent, or Firm*—Douglas W. Cameron; Ronald L. Drumheller

[57] ABSTRACT

The present invention addresses the issue of controlling delay variations (jitter) in packet-switched networks by enhancing the capabilities of existing scheduling policies. The idea is to use a few bits in the header of packets to send jitter control information to the downstream network elements, so that the delay variation caused by the upstream network element, is compensated for by the downstream network element. The key point to observe is that packets (or cells in ATM) may be small, and therefore, not contain many bits in the header that can be used for jitter control. We describe a unique scheme, that utilizes the bits that are available for jitter control in an efficient manner, allowing for the desired jitter to be obtained with as few bits as possible.

2 Claims, 3 Drawing Sheets

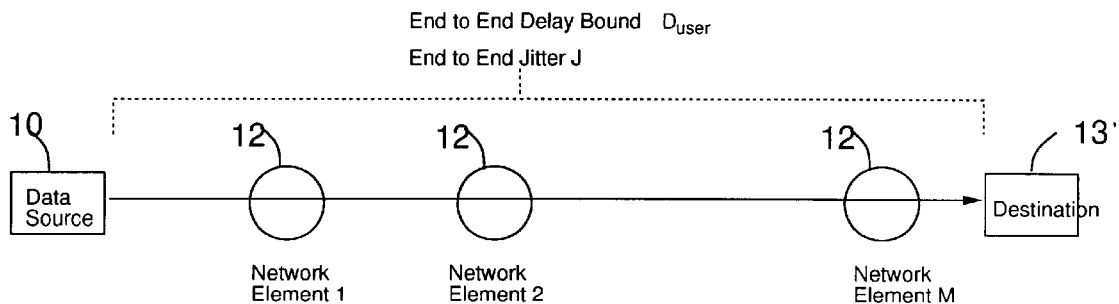
Figure 1: Network elements along a connection path
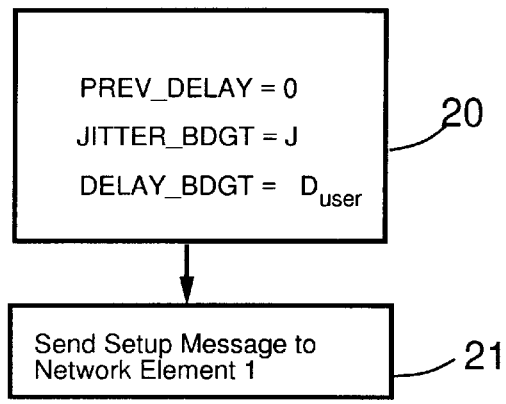
Figure 2: Initialization for user of connection with end-to-end delay and jitter requirements.

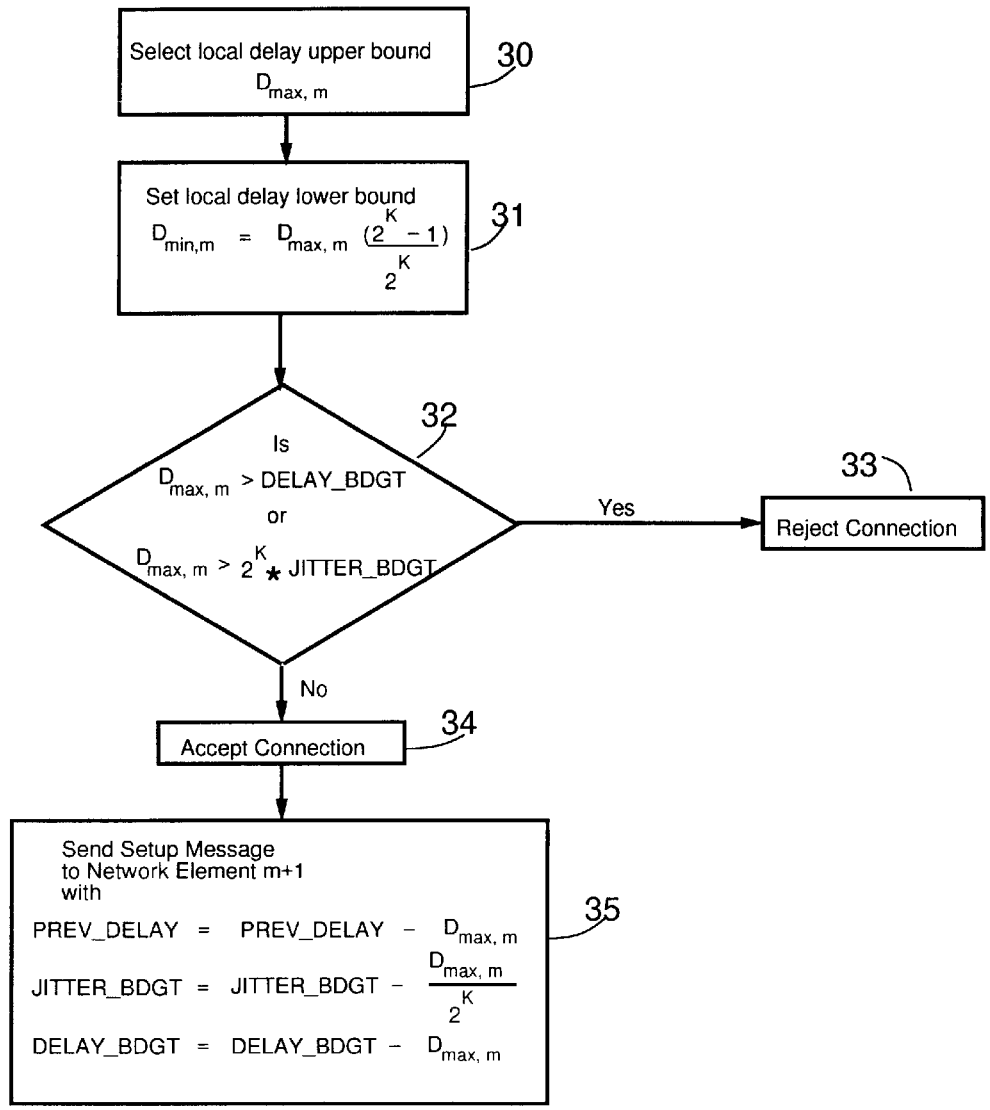
Figure 3: Local delay assignments and connection admission at intermediate Network Element $m$.

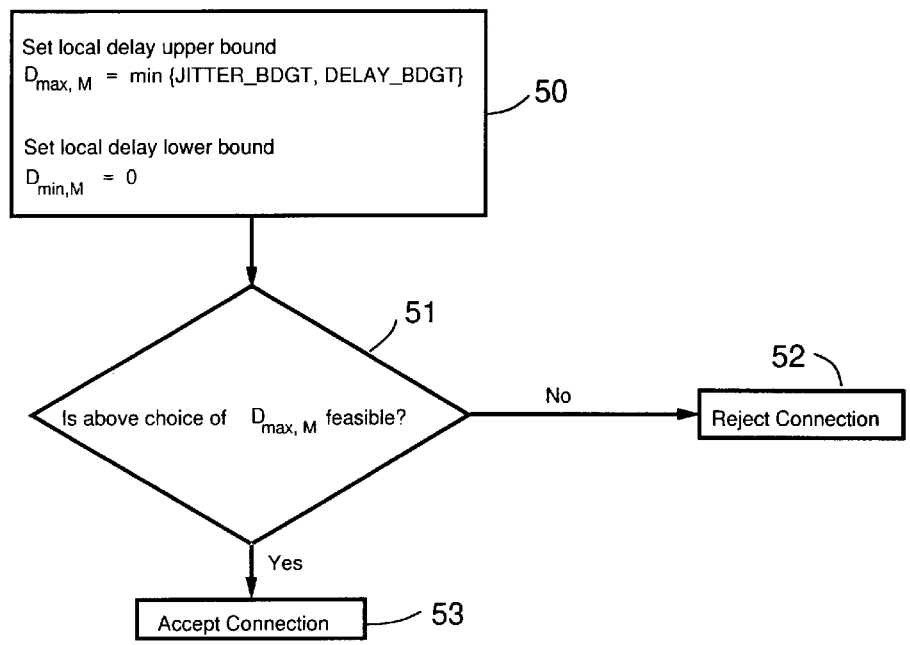
Figure 4: Local delay assignments and connection admission at last Network Element $M$.
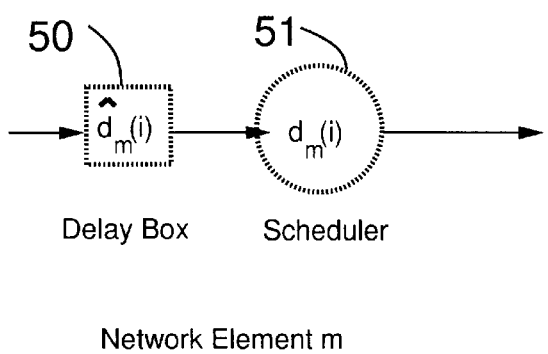
Figure 5: Local delay enforcement and scheduling at Network Element $m$.

METHOD TO CONTROL JITTER IN HIGH-SPEED PACKET-SWITCHED NETWORKS

DESCRIPTION

TECHNICAL FIELD

This invention describes a method and apparatus for controlling the jitter experienced by packets in a high-speed communication network. For many applications like audio and video playback, in addition to the end-to-end delay being bounded, it is also important that the variation in the delay experienced by successive packets (jitter) be kept to a minimum. Herein, we describe a method for restricting the end-to-end jitter experienced by packets of a connection to within limits specified by the user, by appropriately reducing and partitioning the end-to-end delay amongst the various network elements on the path of the connection, and by utilizing a few bits in the header of each packet for the purposes of conveying jitter control information.

DESCRIPTION OF THE PRIOR ART

In a packet-switched network, it is clear that successive packets from the same connection typically encounter different delays. This variation in the delay is due to the fact that packets from many different connections may be contending for the same output link at any given time. This variation in the delay we refer to as jitter. More precisely, if $d_{min}^n$ and $d_{max}^n$ represents the minimum and maximum delays encountered by consecutive packets from connection n, we define the jitter$^n$ to be given by $$\text{jitter}^n = d_{max}^n - d_{min}^n.$$

There are many applications like audio and video playback where, for a reasonable quality output, it is imperative that packets be received with a low value of jitter. In order to smoothly play back a heavily jittered stream, the destination end-system would require large buffers, which may be infeasible due to considerations of cost of buffering or due to the increase in response times because of buffering as seen by interactive applications.

So far, there have been several approaches that try to limit end-to-end jitter, and they can be divided into three categories, based on their goals.

Limit jitter of individual connections by limiting their end-to-end delay.

Design the network to limit the amount of jitter of all connections to some pre-designed fixed value.

Minimize jitter of an individual connection by appropriately delaying its packets at successive hops.

Clearly, one way of keeping the jitter very small is to guarantee very small end-to-end queueing delays to all packets. This is embodied in the first of three above approaches. For small Local Area Networks (LAN) which involve a few hops, this may be a feasible approach; however, this is woefully inadequate for Wide Area Networks (WAN) where the number of hops to be traversed, as well as scheduling and switching delays are highly variable. Therefore, in the WAN context it is very useful to be able to provide a service that can limit the end-to-end jitter that is experienced by a connection to something that is much smaller than the guaranteed end-to-end delay, and this is the subject of this invention.

The Stop-and-go service discipline proposed in [3] falls in the second category, and is based on the notion that traffic on a link can be divided into frames of fixed length. At each network element a complete frame is received before it is transmitted on the next outgoing frame. Since packets can occupy any of the slots in the frame, the end-to-end jitter is limited to two frame lengths. Thus the jitter control that is available is a fixed quantity that depends on the length of the frame. This approach has two drawbacks—first, it is tied to a particular scheduling discipline, making it unsuitable for widespread application; second, it is quite inflexible to user requirements vis-a-vis delay and jitter. In other words, applications see a relatively fixed performance from the network irrespective of their requirements.

There are many schemes that fall in the third category, and examples of some of them can be found in [1, 2, 4]. The approach taken in these schemes is to recreate the original traffic at each network element, by delaying the arriving packets before making them eligible for transmission on the outgoing link. the arrival pattern at a downstream network element, the original inter-arrival times of the packets need to be known at each network elements. This information is assumed to be carried as part of the packets, typically in the element to the other along the path of the connection. In general, the information that is carried is the variable component of the delay that is encountered in the upstream network element, and the cells are delayed at the element by an appropriate amount, so as to ensure that the packet encounters a fixed delay before being eligible for transmission again [4]. The principal drawback of this approach is that it seeks to minimize the jitter of each connection, usually to within some fraction of the delay, rather than as a function of user requirements. This has two implications—some applications may not obtain as jitter-free a service as they require, and others could experience a much smaller jitter than required, at the cost of experiencing the maximum possible end-to-end delays, i.e. the worst-case end-to-end delay guaranteed to a connection. Further, all existing schemes in that category require a large number of bits, typically a 32 bit floating point number, for conveying timing information between adjacent hops.

SUMMARY OF THE INVENTION

An object of this invention, is to provide a mechanism to limit the jitter that is experienced by packets of this connection to at most J, using only the K bits that are available in the data packets header or payload.

This invention provides a jitter control mechanism that is sensitive to user requirements, i.e., it allocates the per-hop delays (and end-packet stream as jitter-free as the application demands, and not much more. Thus, a connection that is admitted is always ensured that the user-specified jitter requirements will be met, and that packets will not be inordinately delayed in suprising these requirements. Another contribution of this invention is its compatibility with a wide variety of scheduling mechanisms. Third, this invention enables jitter control with a few bits—possibly as few as two—with the granularity of the jitter control depending on the number of bits that are available in the packet header. This invention is compatible with the encapsulation provided by a broad range of network and transport layer protocols, in particular ATM.

During the call setup (call admission) phase of a connection, the network controller on the setup path examines the end-to-end delay and end-to-end jitter requirements of the connection, and computes the maximum end-to-end effective delay that would have to be delivered in order to ensure that the jitter requirements of the connection can be met. As the setup proceeds towards the intended destination, each network element on the path exports the maximum delay that may be encountered at that network element by any packets from the connection. This information is conveyed to the next network element on the path by the signalling mechanism in use. Subsequently, when packets are transmitted, each network element sets a few bits, typically in the header of the packet, that indicate to the next network element the amount of delay that this packet has incurred in relation to the maximum possible delay that was signalled earlier. This information is used in the next (downstream) network element to additionally delay the packet before making it eligible for scheduling, thereby limiting the jitter to within a fixed fraction of the maximum upstream delay. Thus, the granularity of the jitter control is a function of the number of bits used in each packet for the purpose of signalling the jitter information. In addition, the jitter control information is used in such a way as to guarantee the required jitter bound, while at the same time, delaying the packet as little as possible and remaining consistent with the user requirements.

BRIEF DESCRIPTION OF THE DRAWINGS

FIG. 1 graphically illustrates a connection path that is established by this invention.

FIG. 2 is a flowchart graphically illustrating the initialization steps for establishing a connection.

FIG. 3 graphically illustrates the flowchart for guaranteeing a desired end-to-end delay bound and jitter.

FIG. 4 graphically illustrates the calculation of the maximum and minimum delay bounds performed at each network element in the connection path.

FIG. 5 graphically illustrates the delay component and scheduler in each network element.

DESCRIPTION OF PREFERRED EMBODIMENT

FIG. 1 is an illustration of a collection of M network elements 12 numbered 1 to M, that make up the path for a connection between a data source 10 and a destination 13 with a requested end-to-end delay bound $D_{user}$ and end-to-end jitter J. Packets originate at the data source 10 and are sent on the path to the destination 13 through network elements 12.

FIG. 2 is a flowchart illustrating the initialization steps performed by a user requesting a connection with given end-to-end delay bound, $D_{user}$ and end-to-end jitter, J. The user initializes (box 20 ) the fields PREV_DELAY, JITTER_BDGT, and DELAY_BDGT to 0, J, and $D_{user}$, respectively, and forwards (box 21) this information to network element 1 as part of the setup message for the connection.

FIG. 3 is a flowchart illustrating the calculation of the maximum and minimum delay bounds that are performed at all but the last of the network elements on a connection's path in order to guarantee the desired end-to-end delay bound and jitter. It shows the various steps involved at a network element, in updating the signalling information in the setup message as well as in performing call admission.

In box 30, network element m determines based on the connection's requirements and the availability of local resources, an appropriate value for the local delay bound $D_{max,m}$ that it can guarantee to the connection. In box 31, this value together with the number of bits K available in the packets of the connection to convey delay information between network elements, is used to identify the local delay lower bound $D_{mim,m}$ that can be guaranteed to the connection. In decision box 32, network element m determines if its choice of the local delay bound $D_{max,m}$ for the connection has resulted in exceeding the remaining delay and jitter budgets available to the connection and specified in the variables DELAY_BDGT and JITTER_BDGT, respectively. If the answer is yes, the end-to-end delay bound and end-to-end jitter requested by the connection cannot be met, and network element m rejects the connection (box 33). If the answer is no, the end-to-end delay bound and end-to-end jitter requested by the connection have not yet been violated, and network element m accepts the connection (box 34). Network element m then forwards the setup message to network element m+1 after updating (box 35) the fields PREV_DELAY ($D_{max,m-1}$), DELAY_BDGT, and JITTER_BDGT based on its local delay bound $D_{max,m}$.

FIG. 4 is a flowchart illustrating the calculation of the maximum and minimum delay bounds performed at the last network element M on a connection's path in order to guarantee the desired end-to-end delay bound and jitter. It shows how this last network element M uses these values to perform call admission.

In box 40, network element M selects its maximum and minimum local delay bounds to be equal to $D_{max,M}$= min{JITTER_BDGT, DELAY_BDGT} and $D_{min,M}$=0, respectively. In decision box 41, network element M determines if this choice for $D_{max,M}$ is feasible given the availability of local resources. If it is, the connection is accepted (box 42) and the setup message is forwarded to the destination of the connection(box 44). If it is not, the connection is rejected (box 43).

FIG. 5 depicts the fixed delay component (50) and the scheduler (51), that are used at a network element (network element m) to, respectively, delay the i-th incoming packet of a connection by the amount of time $\hat{d}_m(i)$ specified by network element m−1 to ensure that the end-to-end jitter bound is met, and to ensure that the local delay bound $D_{max,m}$ is met (the quantity $d_m(i)$ shown in scheduler box 51 is the actual scheduling delay experienced by the i-th packet of the connection.

We consider a network capable of providing strict end-to-end delay guarantees that are composed of the sum of the delay guarantees provided by the individual network elements along the path of a connection. This invention then provides a method for guaranteeing a user specified maximum end-to-end jitter experienced by the packets of a connection.

Consider a user that wishes to initiate a connection setup across a sequence of network elements, numbered 1, 2, . . . , M (see FIG. 1). The user specifies that the end-to-end delay be no greater than $D_{user}$ and that the end-to-end jitter be no greater than J. Further assume that K bits are available in the packets header or payload for the communication of jitter control information. We first describe a one-pass control scheme to allocate local delay upper bounds $D_{max,m}$, 1≦m≦M, at successive netork work elements along the path of the proposed connection. We justify our contention that delay allocation along the lines of the described control scheme will ensure the satisfaction of the user's end-to-end delay bound $D_{user}$ while also accounting for the end-to-end jitter requirements expressed by the user. Following this, we describe the actual sequence of operations subsequently performed by each network element on the receipt of a data packet, in order to ensure that the end-to-end delay and jitter requirements of the end-users are satisfied.

Control Path

We assume that the signalling packets used to carry out this setup have fields designated PREV_DELAY, JITTER_BDGT and DELAY_BDGT.

The field PREV_DELAY is used to inform a downstream network element of the delay bound selected at the previous network element. This information is important to allow simple and accurate determination of the amount by which an arriving packet needs to delayed based on the jitter information it carries, so that the end-to-end jitter bound be met.

The field JITTER_BDGT carries the amount of jitter budget that remains available for the rest of the connection's path.

The field DELAY_BDGT carries the amount of delay budget that remains available for the rest of the connection's path.

The following sequence of computations and local delay reservations are performed at the time of connection setup at successive network elements on the path from the sender to the receiver, and is illustrated in FIG. 3. The user sets the PREV_DELAY field to 0, JITTER_BDGT field to J and the DELAY_BDGT field to $D_{user}$, and transmits the signalling packet to network element 1. Each network element m, $1 \leq m < M$ chooses a local delay upper bound $D_{max,m}$ and sets its local delay lower bound $D_{min,m}=(2^K-1)D_{max,m}/2^K$. If $D_{max,m} \geq$ DELAY_BDGT, or if $D_{max,m}/2^K \geq$ JITTER_BDGT then the connection is rejected. Otherwise, network element m stores the current value of the PREV_DELAY field, and then writes the value $D_{max,m}$ over this field, reduces the JITTER_BDGT field by $D_{max,m}/2^K$, and reduces the DELAY_BDGT field by $D_{max,m}$. The signalling cell is then passed with these new fields to the downstream network element m+1.

Finally, network element M (the last network element on the path) sets its local delay upper bound to be $D_{max,M}=$ min{JITTER_BDGT, DELAY_BDGT} and sets its local delay lower bound to be $D_{min,M}=0$. If local allocations satisfying the above constraints are feasible at every network element m, $1 \leq m \leq M$ then the connection is established successfully, else the connection is rejected.

Next, we establish that the above steps indeed achieve the intended goal of ensuring an end-to-end delay bound of $D_{user}$ and the end-to-end jitter bound of J.

1. The sum of the local delay upper bounds $D_{max,m}$, $1 \leq m \leq M$ does not exceed the user specified delay bound, $D_{user}$, i.e. $\Sigma_{m=1}^{M} D_{max,m} \leq D_{user}$. This is easily seen from the observation that the DELAY_BDGT field in the control packet received at network element m does not exceed $D_{user} - \Sigma_{j=1}^{m-1} D_{max,j}$, and our requirement that the connection be accepted only if $D_{max,m} \leq$ DELAY_BDGT. Thus, if no data packet for this connection is delayed by more than $D_{max,m}$ at any network element m, then the packet will be delivered within the specified delay bound $D_{user}$.

2. The difference between the sum of the local delay upper bounds and the sum of the local delay lower bounds does not exceed the user specified jitter bound J, i.e., $$\sum_{m=1}^{M} D_{max,m} - \sum_{m=1}^{M} D_{min,m} \leq J.$$

Note that at each network element m<M, $D_{max,m}-D_{min,m}=D_{max,m}/2^K$, and that at network element M, $D_{min,M}=0$. In any event, for $1 \leq m \leq M$ $$D_{max,m} - D_{min,m} \leq \text{JITTER\_BDGT}$$

$$= J - \sum_{j=1}^{m-1} (D_{max,j} - D_{min,j}).$$

Consequently, if each data packet is delayed no less than $\Sigma_{m=1}^{M} D_{min,m}$ in the network, and if the end-to-end delay bound for the packet is satisfied, then the end-to-end jitter bound is also satisfied.

Data Path

This describes the operation of each network element in order to ensure that the end-to-end delay and jitter requirements of connections are met. This operation is described under the assumption that In the header (or payload) of each data packet K bits are available for the transmission of delay/jitter information between adjacent network elements.

Information about delay at a network element transmitted using these bits is used by the downstream network element as specified below to delay packets further before scheduling them for transmission.

Once the connection is accepted the flow of packets from source to destination commences. At each network element m, $1 \leq m \leq M$, if each packet is delayed by at least $D_{min,m}$, and no more than $D_{max,m}$, then it is clear that the connection's end-to-end jitter requirement has been met. In this invention, each network element m delays the i-th packet by a duration $\hat{d}_m(i)$ (as specified below) and then schedules the packet for transmission. The delay that packet i encounters from the time it is scheduled for transmission to the time it is completely transmitted at network element m, is measured and is denoted by $d_m(i)$ which is less than the pre-negotiated local delay upper bound at network element m, $D_{max,m}$. Now, let $$l = \left\lceil \frac{D_{max,m} - d_m(i)}{D_{max,m}} 2^K \right\rceil.$$

This value of l is encoded in the K bits of the header that are reserved for jitter control. Note that since $d_m(i) < D_{max,m}$, $0 < l \leq 2^K$, the value of l can be specified using only K bits.

When this packet is received at network element m+1, it reads the value of l from the header and then delays the packet by $\hat{d}_{m+1}(i) = D_{max,m}(l-1)/2^K$, before it is delivered to the scheduler shown in FIG. 5. The delaying of the packet is performed by the delay box shown in FIG. 5, and can readily be implemented using a simple timer-based logic. Note that the value $D_{max,m}$ is available at network element m+1 as it was specified in the field PREV_DELAY of the signalling message it received from network element m at the time of call setup.

Conceptually, the above delay function is depicted as being performed by the delay box shown in FIG. 5. To see that the above sequence of operations at each network elements does indeed succeed in satisfying the end-to-end delay and jitter requirements, simply observe that $$\sum_{m=1}^{M} D_{min,m} \leq \sum_{m=1}^{M-1} \left( d_m(i) + \hat{d}_{m+1}(i) \right) + d_M(i) \leq \sum_{m=1}^{M} D_{max,m}.$$

Hence, the packet is delivered to the destination with all of the quality of service guarantees (delay and jitter) being met.

REFERENCES

[1] D. D. Kandlur, K. G. Shin, and D. Ferrari, Real-time Communication in Multihop Networks. In *Proceedings of the IEEE INFOCOM '91*, pages 300–307, 1991.

[2] D. C. Verma, H. Zhang, and D. Ferrari. Delay Jitter Control for Real-Time Communications in a Packet Switching Network. *Proc. TRICOMM'91*, Chapel Hill, NC, April 1991, pp. 35–46.

[3] S. J. Golestani. A Framing Strategy for Congestion Management. *IEEE Journal of Selected Areas in Communication*, 9(7):1064–1077, September 1991.

[4] L. Nederlof. A Resequencing system. Application for Canadian Patent No. CA 2130234.

Having thus described our invention, what we claim as new and desire to secure by Letters Patents is:

1. In a communications network having a plurality of packet switching nodes, a method for guaranteeing a user specified maximum end-to-end delay $D_{user}$ and a user specified maximum end-to-end delay jitter J experienced by the packets of a connection transmitted through a sequence of said nodes, said method comprising the steps of:

(a) assigning to each node m in said sequence of said nodes a local delay upper bound $D_{max,m}$ such that the sum of said local delay upper bounds $D_{max,m}$ at said nodes m in said sequence of said nodes does not exceed said maximum end-to-end delay $D_{user}$;

(b) assigning to each node m in said sequence of said nodes a local delay lower bound $D_{min,m}$ equal to $(2^K-1)D_{max,m}/2^K$, where K is a number of bits reserved for indicating delay information in each packet of said connection;

(c) measuring the actual local delay $d_m(i)$ that packet i of said connection experiences at a scheduler of each node m before being transmitted from said each node m to a next node m+1;

(d) upon transmission of said packet i from said each node m to the next node m+1, inserting in a reserved field consisting of K bits in said packet i, a K-bit encoding of the quantity $D_{max,m}-d_m(i)$;

(e) at each node m+1 determining a quantity $\hat{d}_{m+1}(i)$ based on said K-bit encoding of $D_{max,m}-d_m(i)$ and knowledge of the local delay upper bound $D_{max,m}$ at node m; and (f) delaying processing of said packet i at node m+1 by the scheduler at node m+1 by an amount $\hat{d}_{m+1}(i)$, whereby the end-to-end delay does not exceed $D_{user}$ and the maximum jitter does not exceed J.

2. A method as recited in claim 1 wherein $\hat{d}_{m+1}(i)+d_m(i)=D_{max,m}$.

* * * * *